Patented June 28, 1949

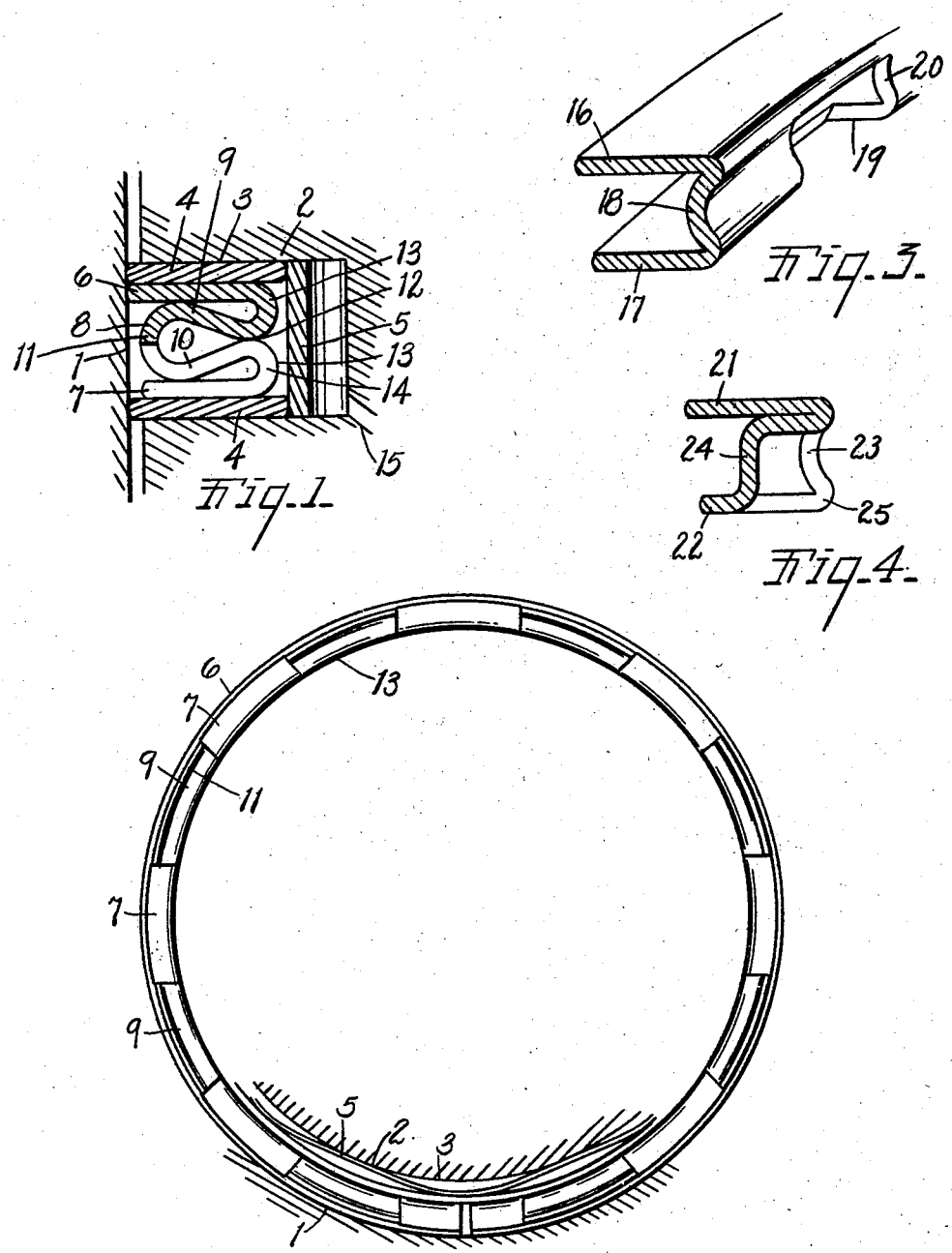

2,474,493

UNITED STATES PATENT OFFICE 2,474,493

PISTON RING ASSEMBLY AND SPACER THEREFOR

Harold P. Phillips, Hastings, Mich., assignor to Hastings Manufacturing Company, Hastings, Mich., a corporation of Michigan Application April 2, 1945, Serial No. 586,152

6 Claims. (Cl. 309—44)

This invention relates to improvements in piston ring assembly and spacer therefor.

This application is a continuation in part of my application filed June 3, 1944, Serial No. 539,271, and now abandoned.

The main objects of this invention are:

First, to provide a composite piston ring comprising steel cylinder wall engaging segments or elements and a spacer associated therewith, the spacer being formed integrally of a thin ductile strip of metal.

Second, to provide a structure of this character in which the spacer may be formed of relatively light material, at the same time effectively supports the spaced cylinder wall engaging elements throughout the radial width thereof.

Third, to provide an improved spacer element which provides a desirable amount of drainage without affecting the strength of the element.

Fourth, to provide a structure having the advantages described which may be handled and installed without liability to distortion or breakage by careless handling.

Objects pertaining to details and economies of the invention will appear from the description to follow. The invention is defined and pointed out in the claims.

Preferred embodiments of the invention are illustrated in the accompanying drawing, in which:

Fig. 1 is a fragmentary view in vertical section illustrating a piston ring assembly embodying my invention in operative relation to a piston and cylinder, the piston and cylinder being shown conventionally and no attempt being made to show the relative dimensions and clearance and tolerance factors.

Fig. 2 is a plan view of the spacer in inverted position.

Fig. 3 is a fragmentary perspective view of a modified form or embodiment of my invention.

Fig. 4 is a sectional view of a further modified form or embodiment of my invention.

In the accompanying drawing, 1 represents a cylinder and 2 a piston having a piston ring groove 3 therein. The assembly illustrated comprises a pair of axially spaced cylinder wall contacting elements 4 of the split expansible type, preferably coiled from ribbon steel. The expander 5 urges these elements against the cylinder wall. My improved spacer is designed to effectively space these elements axially and prevent their canting or tilting relative to each other.

My improved spacer is desirably formed of relatively thin ductile strip metal and comprises an upper flange 6 which supportingly engages the inner side of the upper ring element substantially throughout the radial width thereof and constitutes a cylinder wall engaging element. The lower flange 7 may be somewhat narrower but engages the upper side of the lower cylinder wall engaging element throughout a substantial portion of the width thereof. These flanges are joined by an integral web portion designated generally by the numeral 8, this web portion being in the form of a radially disposed loop of substantial radial depth, the upper and lower sides or reaches 9 and 10 thereof being joined by the curved bight portion 11, the width of the loop being such that its sides engage the flanges 6 and 7 well toward the outer edges thereof.

The sides or reaches of the loop are in abutting supporting relation at 12, see Fig. 1, so that the inner edges of the cylinder wall engaging elements are effectively held in spaced relation.

The sides of the looped web are connected to the flanges by means of reversely curved portions 13. The lower flange 7 has circumferentially spaced slots 14 therein which slots extend into the lower side 10 of the web of the spacer providing a very substantial amount of drainage. The upper flange 6 constitutes a cylinder wall engaging element. This not only serves as a sealing and oil scraping element but also serves to center the spacer out of contact with the expander. The ring assembly is shown in an oil groove having drain passages 15 leading to the interior of the piston and thence to the crank case.

In the embodiment of my invention shown in Fig. 3, the spacer has flanges 16 and 17 corresponding to the flanges 6 and 7 of the embodiment described, these flanges being connected by the outwardly curved web 18. The drainage slots or openings 19 in the lower flange are extended into the web as shown at 20. This structure requires somewhat heavier stock to secure the same rigidity or resistance to collapsing as is shown by the structure of Fig. 1.

In the modification shown in Fig. 4, the flanges 21 and 22 are connected by the web 23 which has portions 24 thereof struck outwardly providing struts between the flanges and forming drain openings 25.

In the embodiments of Figs. 3 and 4 the upper flanges of the spacer are also designed as cylinder wall contacting members.

All three embodiments of my invention are desirable structures and have the advantage of lightness in weight with little likelihood of breakage in installing and at the same time has the desired strength or rigidity to serve the purposes intended and this even where the drainage openings are formed by removing part of the stock as in Figs. 1, 2 and 3. In Fig. 4, no stock is removed.

I have not attempted to illustrate various adaptations and embodiments of my invention as it is believed that this disclosure will enable those skilled in the art to embody or adapt my invention as may be desired.

Having thus described my invention, what I claim as new and desire to secure by Letters Patent is:

1. An annular split spacer for a pair of thin cylinder wall engaging segments comprising upper and lower radially extending flanges, the upper flange constituting a cylinder wall engaging element, and a connecting web therefor, said web being conformed into a radially disposed loop of substantial radial width, the bight of the loop being curved, the sides of the loop adjacent its outer end being in supporting engagement with said flanges, the loop being closed at its inner end and joined to the inner edges of the flanges by reverse curves whereby the associated cylinder wall engaging elements are supported in spaced relation substantially throughout the width thereof, the lower flange and the lower side of the loop having spaced slots therein providing drain openings, the lower flange and the lower side of the loop extending circumferentially of the spacer intermediate said slots and terminating at the edges of said slots.

2. An annular split spacer for a pair of thin cylinder wall engaging segments comprising upper and lower radially extending flanges, and a connecting web therefor, said web being conformed into a radially disposed loop of substantial radial width, the bight of the loop being curved, the sides of the loop adjacent its outer end being in supporting engagement with said flanges, the loop being closed at its inner end and joined to the inner edges of the flanges by reverse curves whereby associated cylinder wall engaging elements are supported in spaced relation substantially throughout the width thereof, the web having spaced openings therein providing drain openings, the web extending circumferentially of the spacer between said openings and terminating at the edges of said openings.

3. An annular split spacer for a pair of thin cylinder wall engaging segments comprising upper and lower radially extending flanges, one of the flanges constituting a cylinder wall engaging element, and a connecting web therefor, said web being conformed into a radially disposed loop of substantial radial width, the sides of the loop adjacent its outer end being in supporting engagement with said flanges, sides of the loop being in supporting relation to each other adjacent their inner edges whereby associated cylinder wall engaging elements are supported in spaced relation substantially throughout the width thereof, the lower flange and the lower reach of the loop having spaced slots therein providing drain openings, the lower flange and the lower reach of the loop extending circumferentially of the spacer intermediate said slots and terminating at the edges of said slots.

4. An annular split spacer of the type described comprising axially spaced side flanges, and a connecting web therefor, one of said flanges constituting a cylinder wall engaging element, said web being conformed into an outwardly expanding loop, the sides of which are in supporting engagement with said flanges adjacent the outer end of the loop and with each other adjacent the inner end of the loop whereby the flanges are supported in axially spaced relation substantially throughout the width thereof, the lower flange and lower side of the loop having spaced drainage openings therein, the lower flange and the lower side of the loop extending circumferentially of the spacer intermediate the openings and terminating at the edges of the openings.

5. An annular split spacer for a pair of cylinder wall engaging elements comprising axially spaced flanges, said flanges being joined at their inner edges by an outwardly bowed connecting web, one of said flanges having spaced openings therein extending into said connecting web providing drain openings for the spacer, one of said flanges constituting a cylinder wall engaging element, said openings being formed by cut-away displacements of said flange and connecting web.

6. An annular split spacer of the type described comprising axially spaced flanges one of said flanges having a continuous peripheral portion of substantial width, and a connecting web for the inner edges of the flanges, portions of said connecting web being struck outwardly at spaced intervals providing bracing elements between the flanges and drain openings through the spacer, the bracing element being in supporting engagement with both flanges in radially spaced relation to both the outer and inner edges thereof.

HAROLD P. PHILLIPS.

REFERENCES CITED

The following references are of record in the file of this patent:

UNITED STATES PATENTS

| Number | Name | Date |
|---|---|---|
| 2,239,376 | Smith | Apr. 22, 1941 |
| 2,273,691 | Bowers | Feb. 17, 1942 |
| 2,358,239 | Mason | Sept. 12, 1944 |
| 2,404,862 | Phillips | July 30, 1946 |

FOREIGN PATENTS

| Number | Country | Date |
|---|---|---|
| 523,275 | Great Britain | July 10, 1940 |